United States Patent
Bae et al.

(10) Patent No.: US 6,256,076 B1
(45) Date of Patent: *Jul. 3, 2001

(54) LIQUID CRYSTAL DISPLAYS HAVING SWITCHING ELEMENTS AND STORAGE CAPACITORS AND A MANUFACTURING METHOD THEREOF

(75) Inventors: Byung-Seong Bae; Jin-Tae Yuh; Byoung-Sun Na, all of Kyungki-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/112,175

(22) Filed: Jul. 8, 1998

Related U.S. Application Data

(63) Continuation-in-part of application No. 08/821,062, filed on Mar. 19, 1997, now Pat. No. 5,808,706.

(30) Foreign Application Priority Data

Dec. 31, 1997 (KR) ................................................ 97-80231
Apr. 28, 1998 (KR) ................................................ 98-15092
May 13, 1998 (KR) ................................................ 98-17138

(51) Int. Cl.$^7$ ................................................ G02F 1/1343
(52) U.S. Cl. ................................................ 349/38; 349/39
(58) Field of Search ................................. 349/38, 39, 54; 257/72, 59

(56) References Cited

U.S. PATENT DOCUMENTS

| | | | |
|---|---|---|---|
| 5,247,289 | * 9/1993 | Matsueda | 345/98 |
| 5,457,553 | 10/1995 | Mori | 349/39 |
| 5,623,350 | 4/1997 | Kawachi et al. | 349/38 |
| 5,701,166 | 12/1997 | Fedorovish et al. | 349/38 |
| 5,790,090 | * 8/1998 | Libsch et al. | 345/94 |
| 5,808,706 | * 9/1998 | Bae | 349/38 |

FOREIGN PATENT DOCUMENTS 9-5780 * 1/1997 (JP) .

* cited by examiner

Primary Examiner—William L. Sikes
Assistant Examiner—Dung Nguyen
(74) Attorney, Agent, or Firm—Myers Bigel Sibley & Sajovec

(57) ABSTRACT

The liquid crystal display also includes pixels which is arranged in a matrix shape and have a liquid crystal capacitor and a switching element. A plurality of storage capacitors has two terminals connected to the switching elements of at least two adjacent pixels. Each pixel except the pixels located at one end of the matrix has at least two storage capacitors, while the pixels located at the end of the matrix have only one respective storage capacitor. Each pixel placed at the other end of the matrix has a storage capacitor having a terminal which is floating or connected to the previous gate line. The pixels located at the ends of the matrix are not used for display.

14 Claims, 14 Drawing Sheets

LIQUID CRYSTAL DISPLAYS HAVING SWITCHING ELEMENTS AND STORAGE CAPACITORS AND A MANUFACTURING METHOD THEREOF

CROSS-REFERENCE TO RELATED APPLICATION

The present application is a continuation-in-part (CIP) of application Ser. No. 08/821,062, filed Mar. 19, 1997, entitled "Thin-Film Transistor Liquid Crystal Display Devices Having Cross-Coupled Storage Capacitors, now U.S. Pat. No. 5,808,706, assigned to the present assignee, the disclosure of which is hereby incorporated herein by reference.

FIELD OF THE INVENTION

The present invention relates to display devices and methods of forming display devices, and more particularly to liquid crystal display devices and methods of forming liquid crystal display devices.

BACKGROUND OF THE INVENTION

In order to minimize the space required by display devices, research into the development of various flat panel display devices such as LCD display devices, plasma display panels (PDP) and electro-luminescence displays (EL) has been undertaken to displace larger cathode-ray tube displays (CRT) as the most commonly used display devices. Particularly, in the case of LCD display devices, liquid crystal technology has been explored because the optical characteristics of liquid crystal material can be controlled in response to changes in electric fields applied thereto. As will be understood by those skilled in the art, a thin film transistor liquid crystal display (TFT LCD) typically uses a thin film transistor as a switching device and the electrical-optical effect of liquid crystal molecules to display data visually.

At present, the dominant methods for fabricating liquid crystal display devices and panels are typically methods based on amorphous silicon (a-Si) thin film transistor technologies. Using these technologies, high quality image displays of substantial size can be fabricated using low temperature processes. As will be understood by those skilled in the art, conventional LCD devices typically include a transparent (e.g., glass) substrate with an array of thin film transistors thereon, pixel electrodes, orthogonal gate and data lines, a color filter substrate and liquid crystal material between the transparent substrate and color filter substrate. The use of a-Si TFT technology typically also requires the use of separate peripheral integrated circuitry to drive the gates and sources (i.e., data inputs) of the TFTs in the array. In particular, gate driving signals from a gate driving integrated circuit are typically transmitted to the gate electrodes of TFTs in respective rows and data driving signals from a data driving integrated circuit are typically transmitted to the source electrodes of TFTs in respective columns. A display is typically composed of a TFT substrate in which a plurality of liquid crystal pixels are formed. Each pixel typically has at least one TFT and a pixel electrode coupled to the drain of the respective TFT. Accordingly, the application of a gate driving signal to the gate of a TFT will electrically connect the pixel electrode of a respective TFT to the data line connected thereto.

Referring now to FIG. 1, a first TFT LCD display cell of a conventional TFT LCD display device is illustrated. Each cell comprises a TFT transistor having a source electrode connected to a data line (DL), a gate electrode connected to a gate line (GL) and a drain electrode connected to a respective pixel electrode internal to the cell. As will be understood by those skilled in the art, a storage capacitor (Cst) is utilized to sustain the pixel electrode voltage during holding periods and the liquid crystal capacitor ($C_{LC}$) is connected in series between a respective pixel electrode and a common electrode (Vcom) of a color filter substrate. The storage capacitor also has an electrode connected to a storage electrode line (SL). The storage capacitors of adjacent display cells in a row thereof may also have electrodes which are connected to the storage electrode line (SL). However, as will be understood by those skilled in the art, the use of an independent storage electrode line (SL) for each row of display cells may decrease the display device's aperture ratio.

Referring now to FIG. 2, another conventional TFT LCD display device is illustrated. Each cell comprises a TFT transistor having a source electrode connected to a data line (DL), a gate electrode connected to a gate line (GL) and a drain electrode connected to a respective pixel electrode internal to the cell. As illustrated, a liquid crystal capacitor ($C_{LC}$) in each cell is connected in series between a respective pixel electrode and a common reference potential (Vcom) and the storage capacitor in each cell is connected in series between a respective pixel electrode and a next lower order gate line (GL). Unfortunately, although the aperture ratio of the device of FIG. 2 may be greater than the aperture ratio of the device of FIG. 1, the parasitic capacitance of each gate line (GL) is relatively high in the device of FIG. 2. Moreover, in the event any of the TFTs in the devices of FIGS. 1 and 2 are defective, the voltage on the corresponding pixel electrode may be driven to a level which is significantly different than the value of the data to be loaded into the defective cell and this can corrupt the fidelity of the final displayed image.

Accordingly, notwithstanding the above described display devices, there still continues to be a need for improved display devices which have high aperture ratio and reduced parasitic gate line capacitance.

SUMMARY OF THE INVENTION

In view of the above, it is an object of the present invention to form a storage capacitor for an LCD without decreasing the aperture ratio and without increasing the number of the wires.

It is another object of the present invention to improve the display characteristic of an LCD.

These and other objects, features and advantages are provided, according to the present invention, by providing a storage capacitor having two terminals connected to drain terminals of different pixels. The liquid crystal display having the storage capacitor may be a dot inversion driving type.

In detail, according to the present invention, the liquid crystal display includes a plurality of gate lines and data lines which transmit scanning signals and image signals from outside, respectively. A plurality of pixels are arranged in a matrix shape, and each pixel has a liquid crystal capacitor having a first and a second terminals and a switching element having a first to a third terminals. The first and the second terminals of the switching element are connected to the gate line and the data line respectively, and the third terminal is connected to the first terminal of the liquid crystal capacitor. The second terminal of each liquid crystal capacitor is connected to a reference voltage. The liquid crystal display also includes a plurality of storage capacitors, and each storage capacitor has a first terminal and a second terminal connected to the third terminals of the switching elements of different pixels. In the dot inversion driving, the first terminals of the liquid crystal capacitors of adjacent pixels in a row of the matrix are applied with image signals having different polarities relative to the reference voltage. Here, it is preferable that the different pixels are adjacent pixels.

According to the present invention, these and other objects, features and advantages are also provided by providing a storage capacitor electrode on a substrate for a liquid crystal display panel having a pixel electrode and a common electrode. The storage capacitor electrode overlaps one drain electrode via a gate insulating layer, and is connected to the another drain electrode through a contact hole in the gate insulating layer.

In particular, a liquid crystal display panel according to the present invention includes a gate wire having a gate line transmitting a scanning signal from outside and a plurality of gate electrodes connected thereto, a plurality of linear common electrodes and a plurality storage capacitor electrodes. The gate wire, the common electrodes and the storage capacitor electrodes are formed on a substrate and separated from one another. The gate wire and the common electrodes and the storage capacitor electrodes are covered with a gate insulating layer which has a plurality of contact holes exposing the storage capacitor electrodes. A plurality of channel layers are formed on the gate insulating layer over the gate electrodes, and a plurality of contact layers are formed on the channel layers. Each contact layer has a first and a second portions separated from each other, and a plurality of source electrodes are formed on the respective first portions of the contact layers. The liquid crystal display panel also includes a plurality of drain electrodes, and each drain electrode has a first portion and a second portion connected to each other. The first portion of the drain electrode is formed on the second portion of each contact layer, and the second portion is formed on the gate insulating layer. The second portion of the drain electrode overlaps one of the storage capacitor electrodes to form a storage capacitor and is connected to another storage capacitor electrode through one of the contact holes in the gate insulating layer. A plurality of linear pixel electrodes are formed on the gate insulating layer and connected to the respective drain electrodes. Each pixel electrode is spaced apart from the common electrodes and located between the common electrodes. A plurality of data lines transmitting image signals from outside are formed on the gate insulating layer and connected to the source electrodes.

A common signal line transmitting a common signal from outside may be formed on the substrate and connected to the common electrodes. In addition, a pixel electrode line connected to the pixel electrodes may be formed on the gate insulating layer and overlap the common signal line to form another storage capacitor.

According to the present invention, the above-described LCD is be manufactured by forming a gate wire, a common wire including common electrodes and a common electrode line and storage capacitor electrodes on a substrate. A gate insulating layer is formed over the gate wire, the common wire and the storage capacitor electrode, and an amorphous silicon layer and a doped amorphous silicon layer is formed on the gate insulating layer over the gate electrode in sequence. A contact hole exposing a portion of storage capacitor electrode is formed in the gate insulating layer, and a data line, source and drain electrodes, a pixel electrode line and pixel electrodes are formed thereon.

According to the present invention, these and other objects are provided by providing dummy pixels which are not used for display at least at one end of a pixel array may be formed. The dummy pixels have either only one storage capacitor or a capacitor including a floating terminal. According to the present invention, the floating terminal may be connected to a previous gate line.

In particular, a liquid crystal display according to the present invention includes an array of pixels including a first and a second pixels located at opposite ends of the array of pixels. Each pixel has a liquid crystal capacitor and a switching element. Each pixel further includes a storage capacitor having a first and a second terminals. The first terminal of the storage capacitor of each pixel is connected to the switching element of the pixel, and the second terminal of the storage capacitor of each pixel except the first pixel is connected to the switching element of another pixel such that the switching element of each pixel except the second pixel is connected to at least two storage capacitors. Here, at least one of the first and the second pixels is a dummy pixel which is not used for display.

According to the another aspect of the present invention, a liquid crystal display includes three types of pixels, i.e., first to third pixels. The first pixels form a pixel array and each first pixel has a liquid crystal capacitor, a switching elements and a first storage capacitor having a first terminal connected to the switching element and a second terminal. The second pixel is located at an end of the pixel array and has a liquid crystal capacitor, a switching element and a second storage capacitor having a first terminal connected to the switching element of the second pixel and a second terminal. The third pixel is located at an end of the pixel array and has a liquid crystal capacitor and a switching element. Here, the second terminal of the first storage capacitor of each first pixel is connected to the switching element of either another first pixel or the third pixel. The second terminal of the second storage capacitor is connected to the switching element of at least one of the first pixels and the third pixel. Therefore, the switching element of each first pixel is connected to at least two of the first storage capacitors and the second storage capacitor, and the switching element of the third pixel is connected to only one of the first storage capacitors and the second storage capacitor. The third pixel is a dummy pixel which is not used for display.

According to the another aspect of the present invention, a liquid crystal display includes a plurality of pixels arranged in a matrix shape. Each pixel has a liquid crystal capacitor having a first and a second terminals and a thin film transistor having a gate, a source and a drain connected to the first terminal of the liquid crystal capacitor. There are provided a plurality of gate lines, and each gate line is connected to the gates of the pixels in a row. In addition, there exist a plurality of data lines and each data line is connected to the sources of the pixels in a column. The liquid crystal display according to the present invention also includes a plurality of first storage capacitors, and each first storage capacitor has a first and a second terminals connected to the drains of adjacent two of the pixels in a row. A plurality of second storage capacitors are also provided and each second storage capacitor has a first terminal and a second terminal which is connected to the drain of one of the pixels in a first column located at a first end of the matrix. Here, the drain of each pixel in the first column is connected to one of the first and the second terminals of one of the first storage capacitors and to the second terminal of one of the second storage capacitors. The drain of each pixel in a second column located at a second end of the matrix opposite the first column is connected to only one of the first and the second terminals of one of the first storage capacitors. The drain of each pixel in columns except for the first and the second columns is connected to two of the first storage capacitors. Here, the pixels in one of the first and the second columns are dummy pixels which are not used for display.

The pixels of both the first and the second columns may not be used for display.

DETAILED DESCRIPTION OF THE PREFERRED EMBODIMENTS

Figure 1:
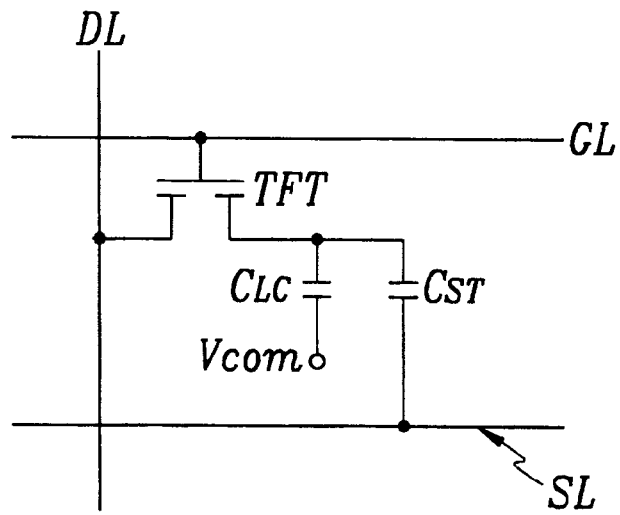
FIG. 1 is an equivalent circuit diagram of a conventional separate-electrode-type TFT LCD.
Figure 2:
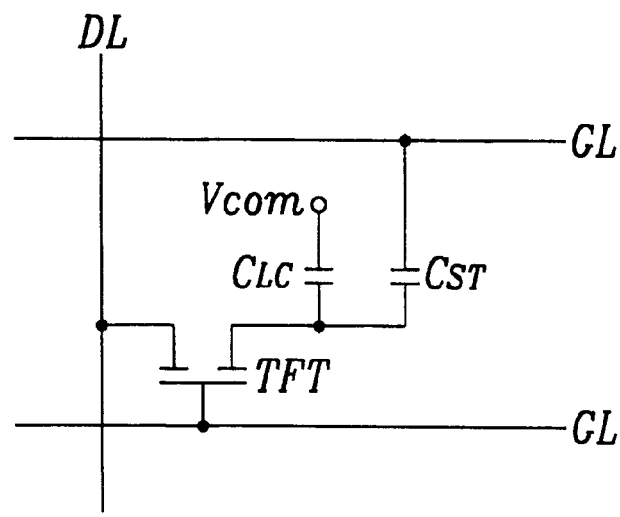
FIG. 2 is an equivalent circuit diagram of a conventional previous-gate-type TFT LCD.

The present invention will now be described more fully hereinafter with reference to the accompanying drawings, in which preferred embodiments of the present invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity.

Figure 3:
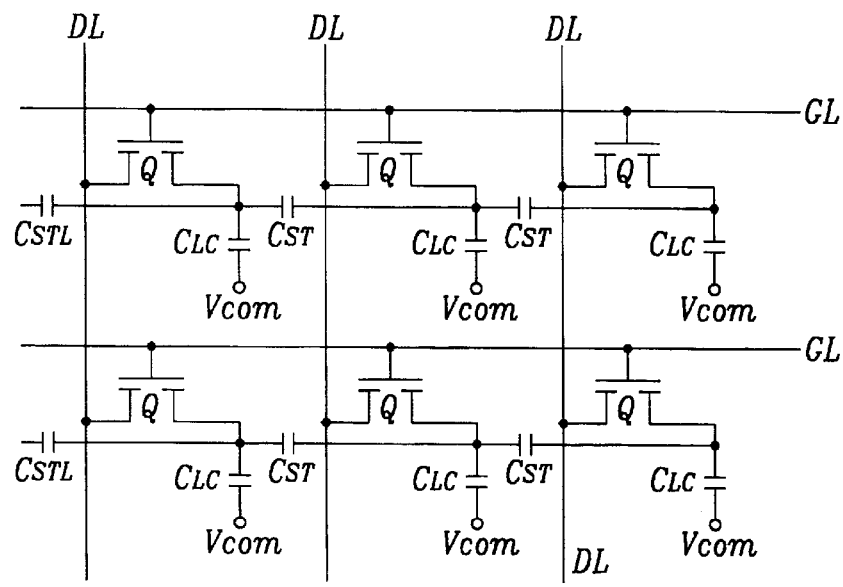
FIG. 3 is an equivalent circuit diagram of a TFT LCD according to the first embodiment the present invention.
Figure 4:
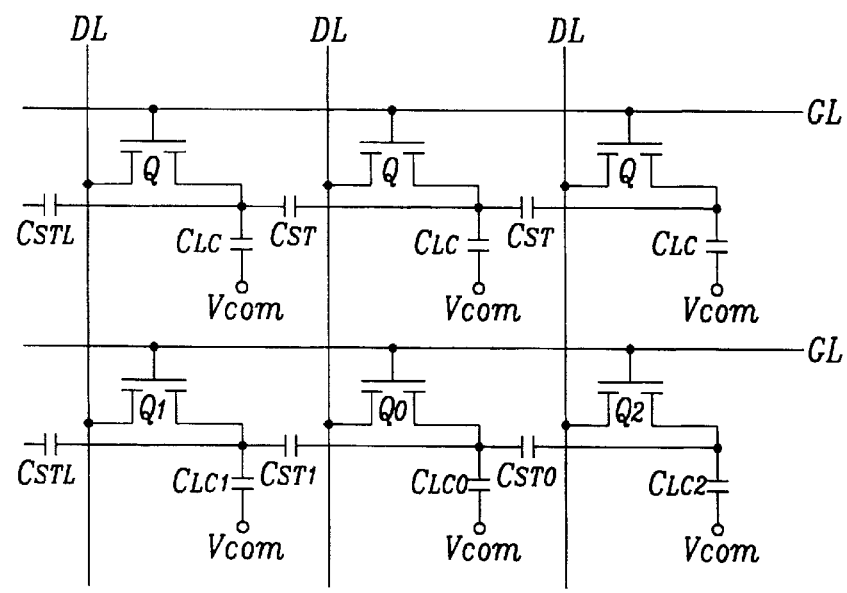
FIG. 4 shows a repairing method of a defective pixel in an LCD shown in FIG. 3.

FIG. 3 is an equivalent circuit diagram of a TFT LCD according to the first embodiment of the present invention, and FIG. 4 shows a repairing method of a defective pixel in the LCD shown in FIG. 3.

As shown in FIG. 3, a plurality of gate lines GL and a plurality of data lines DL extend in the transverse direction and in the longitudinal direction, respectively, and the gate lines and the data lines define pixels which are arranged in a matrix shape. That is, each pixel has a liquid crystal capacitor $C_{LC}$ and a switching element such as a thin film transistor Q connected thereto. A gate terminal of the thin film transistor Q is connected to one of the gate lines GL, and a source and a drain terminals are connected to one of the data lines DL and the first terminal of the liquid crystal capacitor $C_{LC}$, respectively. A common voltage $V_{com}$ is applied to the second terminal of the liquid crystal capacitor $C_{LC}$.

There are a plurality of storage capacitors, each having two terminals connected to respective drain terminals of the TFTs of adjacent two pixels in a row. The pixels in a row means the pixels connected to the same gate line.

In detail, there are two storage capacitors connected to a drain terminal of a TFT of one pixel except for the rightmost pixel, and there is only one storage capacitor connected to the rightmost pixel. One terminal of one $C_{STL}$ of two storage capacitors, which are connected to the drain electrode of the TFT of the leftmost pixel, is floating. As a result, each pixel except for the rightmost pixel has two storage capacitors and the rightmost pixel has one storage capacitor.

Now, a repairing method of the LCD shown in FIG. 3 is described with reference to FIG. 4.

As shown in FIG. 4, when a TFT $Q_0$ of a pixel is defective, the drain electrode of the defective TFT $Q_0$ may be separated from the liquid crystal capacitor $C_{LC0}$ and the storage capacitors $C_{ST0}$ and $C_{ST1}$ connected thereto by cutting the drain of the defected TFT $Q_0$ using laser or the like. Then, the TFT $Q_0$ cannot transmit the image signal to the liquid crystal capacitor $C_{LC0}$ of the pixel, and by the charge conservation rule, the pixel voltage $V_P$ of the liquid crystal capacitor $C_{LC0}$ of the pixel is determined by the relation, $$V_P=(V_L+V_R+C_{lc}/C_{st})/(2+C_{lc}/C_{st}),$$

where $V_L$ is the left pixel voltage of the adjacent liquid crystal capacitor $C_{LC1}$ connected to the storage capacitor $C_{ST1}$, $V_R$ is the right pixel voltage of the liquid crystal capacitor $C_{LC2}$ connected to the adjacent storage capacitor $C_{ST0}$, $C_{lc}$ is the capacitance of the liquid crystal capacitor $C_{LC0}$ of the pixel, and $C_{st}$ is the capacitance of the storage capacitor $C_{ST0}$ of the pixel. Since $C_{lc}/C_{st}$ is smaller than 1 and $C_{lc}/C_{st}$ decreases as $C_{st}$ increases, the pixel voltage $V_P$ approaches to the arithmetical mean of the pixel voltages $V_L$ and $V_R$ of the neighboring liquid crystal capacitors $C_{LC1}$ and $C_{LC2}$. Therefore, the luminance of the defective pixel approaches to the arithmetical mean of the left and right pixel luminance, and the pixel defect is compensated automatically.

This principle may also be adapted to the case that the drain of the thin film transistor is cut due to error in the manufacturing process.

Since the brightness of a screen varies gradually except at the boundary of an object on the screen, this is a good redundant structure for the pixel defects especially for the monochromatic display. For color display, the storage capacitors of a pixel may be connected to the third neighboring pixels which display the same color as the pixel in order to achieve the effective self redundancy. However, it is possible to connect adjacent pixels to each other via the storage capacitors.

Figure 5:
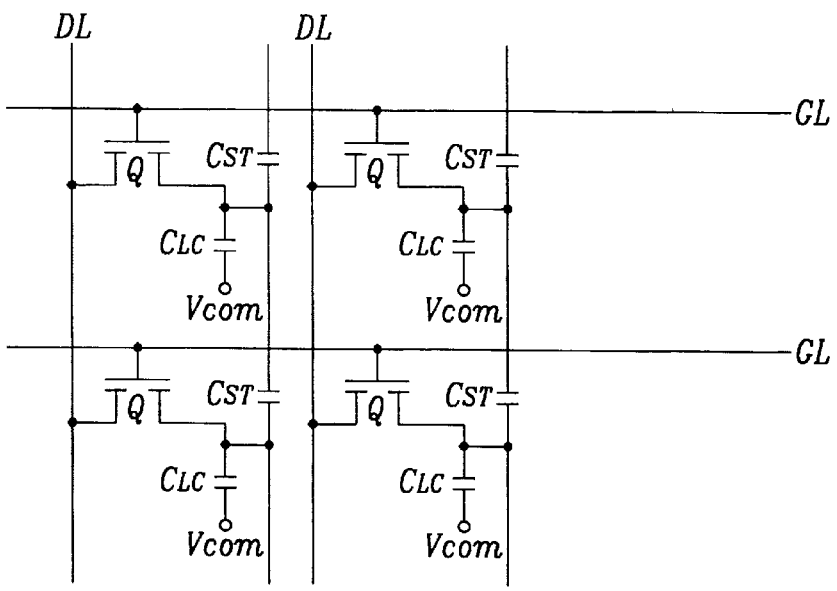
FIG. 5 is an equivalent circuit diagram of a TFT LCD according to the second embodiment of the present invention.

FIG. 5 is an equivalent circuit diagram of a TFT LCD according to the second embodiment of the present invention, where two terminals of a storage capacitor $C_{ST}$ are connected to the drain electrodes of adjacent two pixels in a column. The pixels in a column mean the pixels connected to the same data line.

As shown in FIG. 5, there are a plurality of gate lines GL, data lines DL, liquid crystal capacitors $C_{LC}$ and TFTs Q as in the first embodiment.

There are a plurality of storage capacitors $C_{ST}$, each having two terminals connected to respective drain terminals of the TFTs Q of adjacent two pixels in a column. As a result, there are two storage capacitors $C_{ST}$ connected to a drain terminal of a TFT Q of one pixel, and each pixel has two storage capacitors $C_{ST}$.

A repairing method of the LCD shown in FIG. 5 is described with reference to FIG. 6.

Figure 6:
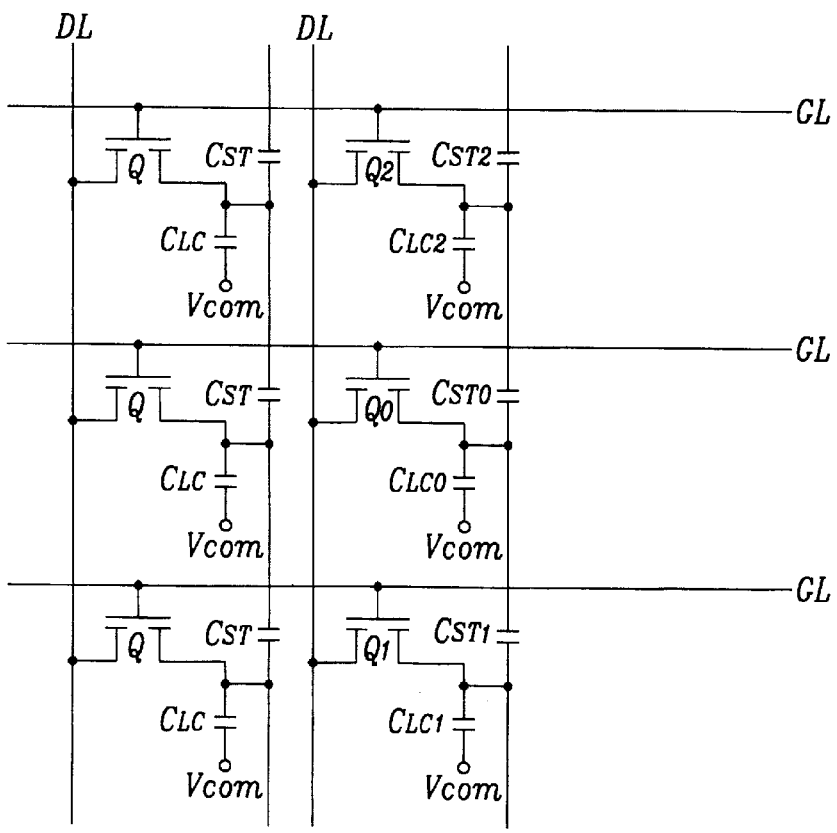
FIG. 6 shows a repairing method of a defective pixel in an LCD shown in FIG. 5.

When a TFT $Q_0$ of a pixel is defective, the drain electrode of the defective TFT $Q_0$ may be separated from the liquid crystal capacitor $C_{LC0}$ and the storage capacitors $C_{ST0}$ and $C_{ST1}$ connected thereto by cutting the drain of the defected TFT $Q_0$ as shown in FIG. 6. Then, as in the first embodiment, the luminance of the pixel having the defective TFT $Q_0$ approaches to the arithmetical mean of the upper and lower pixel luminance, and the pixel defect is compensated automatically. In this case, a color display may have an effective redundant structure if the pixels in a column display the same color.

Figure 7:
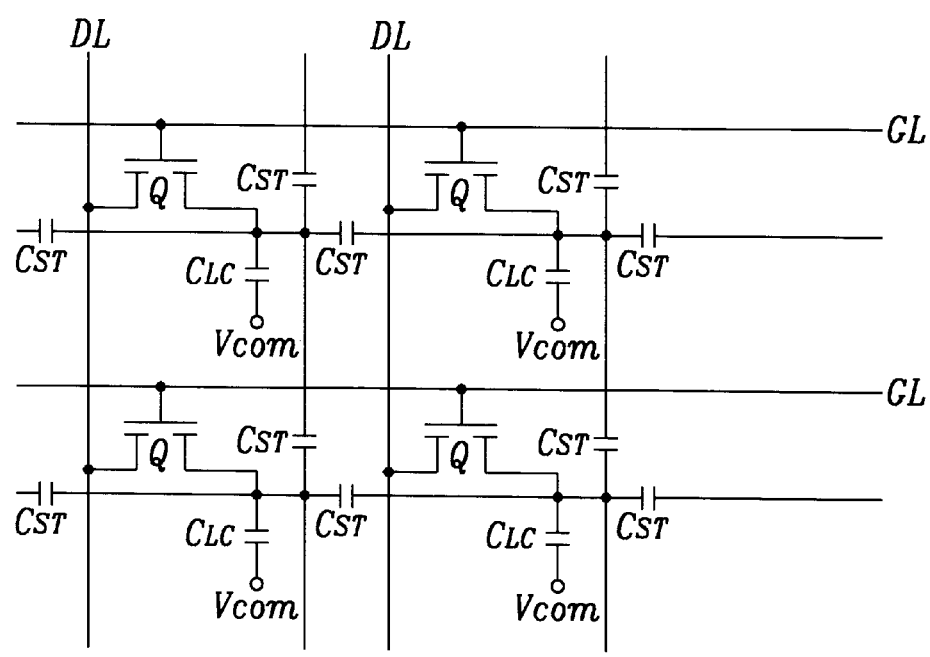
FIG. 7 is an equivalent circuit diagram of a TFT LCD according to the third embodiment of the present invention.

Any adjacent two pixels may be connected to each other via the storage electrodes, for example, a pixel may be connected to the left, the right, the upper and the lower adjacent pixels via the storage electrodes as shown in FIG. 7, which is an equivalent circuit diagram of a TFT LCD according to the third embodiment of the present invention.

As shown in FIG. 7, the drain electrodes of every two adjacent pixels are connected to each other via a storage capacitor $C_{ST}$. Therefore, each pixel have four storage capacitors.

Now, the structures of panels for LCDs having the above-described storage capacitor will be described more fully. Although the LCD includes two opposite panels, only one panel is illustrated in the figures.

Figure 8:
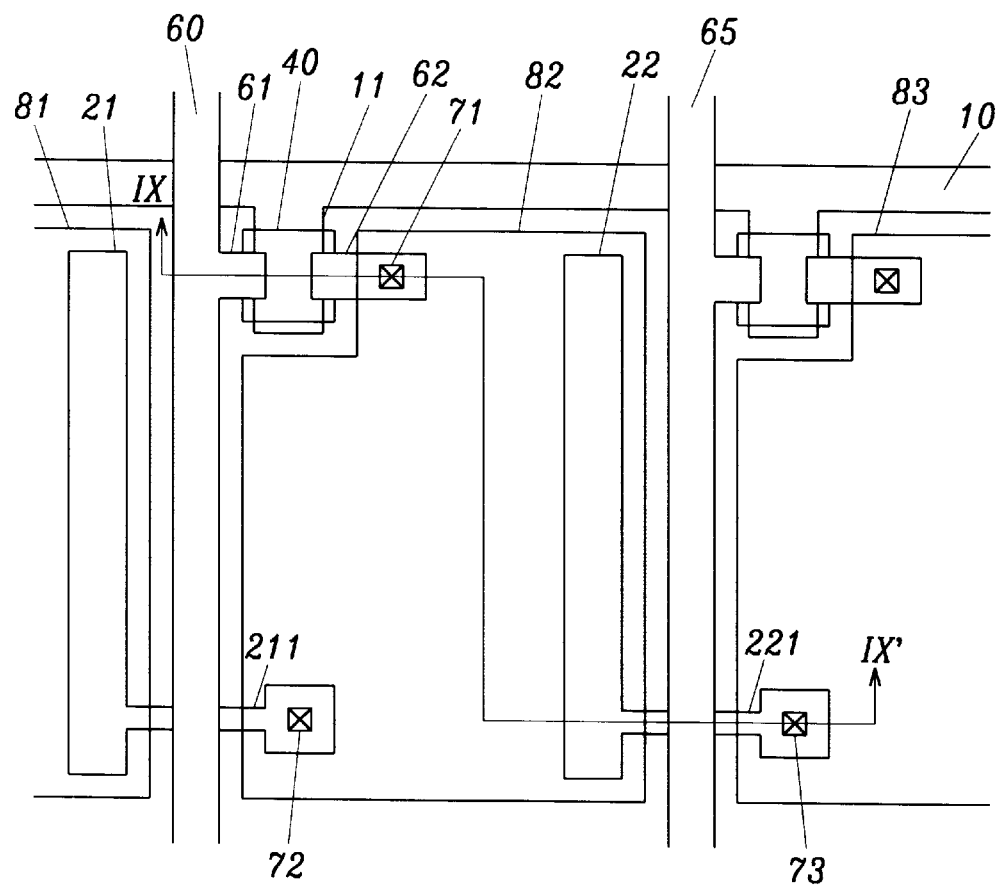
FIG. 8 is a layout view of an LCD according to the fourth embodiment of the present invention.
Figure 9:
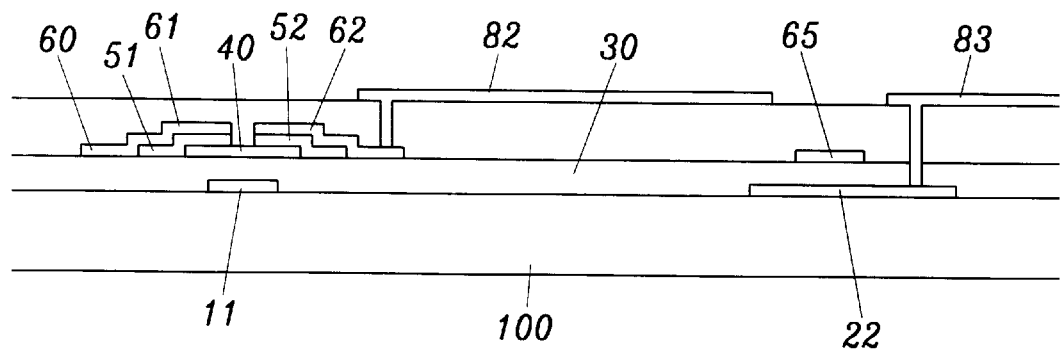
FIG. 9 is a cross-sectional view of the LCD shown in FIG. 8 taken along the line IX–IX'.

FIG. 8 illustrates a layout view of a panel for an LCD according to the fourth embodiment of the present invention, and FIG. 9 is a cross-sectional view of the LCD panel shown in FIG. 8 taken along the line IX–IX'.

As shown in FIGS. 8 and 9, a gate line 10 extending in a transverse direction is formed on a transparent insulating substrate 100, and a plurality of gate electrodes 11 which are branches of the gate line 10 are formed on the substrate 100. A plurality of storage capacitor electrodes 21 and 22 are also formed longitudinally on the substrate 100 and have transverse branches 211 and 221. A gate wire including the gate line 10 and the gate electrodes 11 and a storage wire including the storage capacitor electrodes 21 and 22 and their branches 211 and 221 are separated from each other.

A gate insulating layer 30 made of an insulator such as silicon nitride or the like is formed over the gate wire 10 and 11 and the storage wire 21, 22, 211 and 221.

A plurality of channel layers 40 made of semiconductor such as amorphous silicon are formed on the portions of the gate insulating layer 30 over the gate electrodes 11. A plurality of ohmic contact layers 51 and 52 made of a material reducing the contact resistance between the channel layers 40 and wires thereon, for example, made of heavily doped amorphous silicon is formed on the amorphous silicon layers 40, and each ohmic contact layer is divided into two portions 51 and 52 opposite each other with respect to the gate electrode 11.

A plurality of data lines 60 and 65 transmitting image signals are formed on the gate insulating layer 30, and extend in the longitudinal direction. The data lines 60 and 65 intersect the gate line 10 and the branches 211 and 221 of the storage capacitor electrodes 21 and 22. Therefore, an end portion of the each branch 211 or 221 is opposite the storage capacitor electrode 21 or 22 connected thereto with respect to the data line 60 or 65.

A source electrode 61 connected to one of the data lines 60 and 65 and a drain electrode 62 are formed on the respective portions 51 and 52 of each ohmic contact layer.

The gate electrode 11, the gate insulating layer 30, the channel layer 40, the ohmic contact layer 51 and 52 and the source and the drain electrodes 61 and 62 form a TFT.

A passivation layer 70 made of an insulator such as silicon nitride or the like is formed over a channel layers 40 and a data wire including the data lines 60 and 65 and the source and the drain electrodes 61 and 62. The passivation layer 70 has contact holes 71 exposing portions of the drain electrodes 62, and the passivation layer 70 and the gate insulating layer 30 have contact holes 72 and 73 exposing the end portions of the branches 211 and 221 of the storage capacitor electrodes 21 and 22. A plurality of pixel electrodes 81, 82 and 83 are formed on the passivation layer 70 in the pixel regions which are enclosed by the gate line 10 and the data lines 60 and 65. The pixel electrode 82 is connected to the drain electrode 62 through the contact hole 71. The pixel electrode 82 overlaps the storage capacitor electrode 22 to form a storage capacitor, and is connected to the storage capacitor electrode 21 of an adjacent pixel region through the contact hole 72 and the branch 211. The pixel electrodes 81, 82 and 83 form liquid crystal capacitors along with a reference electrode (not shown) formed on opposite panel (not shown).

The operation of the above-described LCD will now be illustrated.

First, gate on voltage is applied to the gate electrode 11 of a pixel through the gate line 10 to make the TFT to turn on. A data voltage, which indicates a display signal, is applied to the source electrode 61 through the data line 60, and the data voltage is transmitted to the drain electrode 62 through the channel layer 40 of the TFT. The data voltage is then applied to the pixel electrode 82, and the electric field is generated between the two panels due to the voltage difference between the pixel electrode 82 and the reference electrode on the opposite panel. The strength of the electric field is controlled by the magnitude of the data voltage, and the liquid crystal molecules are re-arranged by the electric field, thereby controlling the transmittance of the incident light.

In the mean time, the direction of the electric field may be changed periodically to prevent deterioration of the liquid crystal material. That is, the polarity of the data voltage relative to the reference voltage applied to the reference electrode of the opposite panel may be changed periodically. The above-described driving method is called inversion driving. There are many types of inversion driving, for example, frame inversion, line inversion, dot inversion and column inversion, etc.

The frame inversion is that the polarity of the data voltage relative to the reference voltage changes by unit of a frame. In the case of the line inversion, the polarity of the data voltage changes by unit of a row, and in the case of the dot inversion, the polarity changes by unit of a pixel.

During turning on of the transistors connected to one gate line, all the pixels, in particular, the liquid crystal capacitor connected to the gate line are charged up to a pixel voltage corresponding to the applied data voltages. Then, the pixel voltages are sustained until the next turning on of the transistors. According to the embodiments of the present invention, each data voltage is the reference voltage to the adjacent storage capacitor.

In the case of the frame inversion, since the adjacent pixels may have the similar data voltages, the voltage difference between the two electrodes of the storage capacitor is negligible. The small voltage difference gives lower leakage current which flows through the capacitor dielectric. It also enhances the reliability of capacitor dielectric and results in the long lifetime of the display panel.

Figure 10:
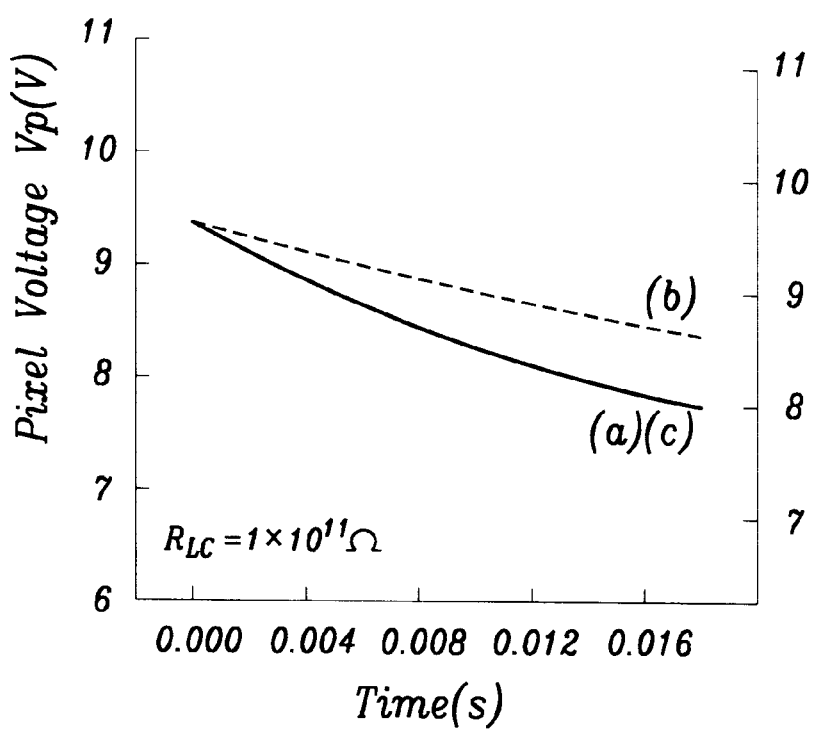
FIGS. 10–12 are simulated graphs of the voltage holding capability of the LCD according to the fourth embodiment of the present invention.
Figure 11:
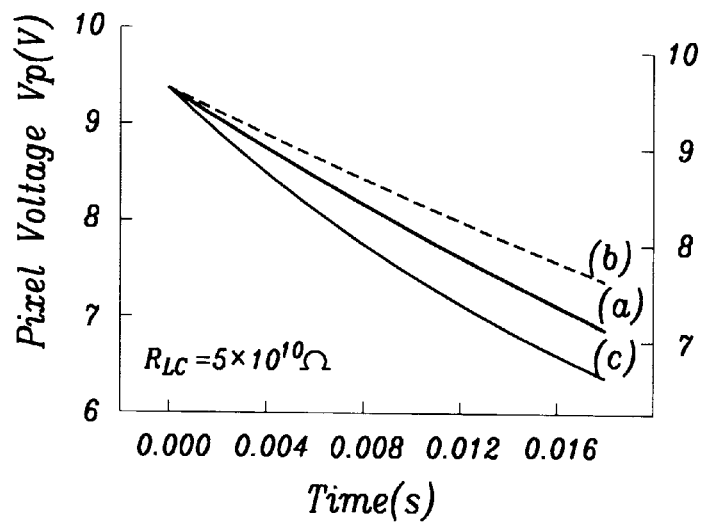
Figure 12:
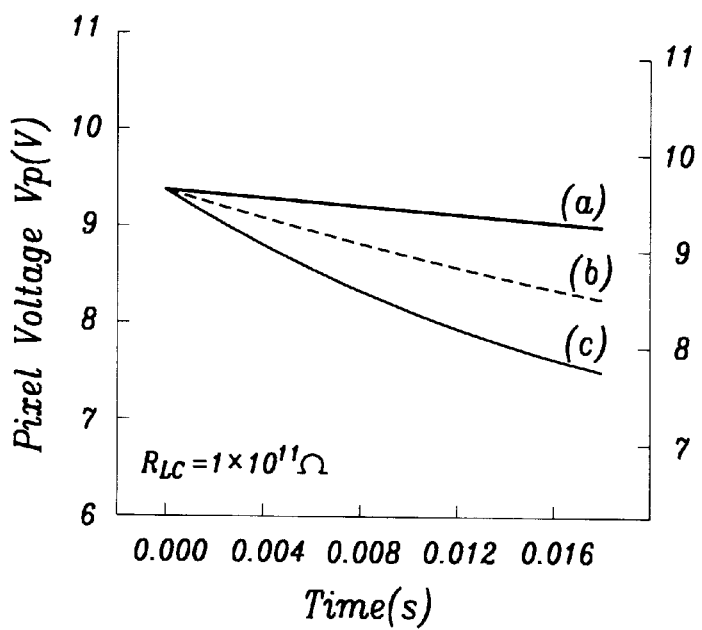

The voltage holding capability of the storage capacitor against the pixel leakage current of the LCD according to the fourth embodiment of the present invention was simulated, and the results are shown in FIGS. 10–12. The simulations were performed for the 3×9 pixel array with the varying resistance $R_{LC}$ of the liquid crystal layer. The common voltage applied to the common electrode was kept 5V during the simulation, and the data voltages are 1 V or 10V.

For the fifth pixel of the second row, the simulated pixel voltages in case of the line inversion is shown as a function of time in FIG. 10. All the data voltages are kept 10V during the writing time for a row, and the resistance $R_{LC}$ of the liquid crystal layer is $1\times10^{11}\Omega$ in this simulation. The curves (a) and (c), which show the same curve, indicate the pixel voltages of the LCD according to the fourth embodiment of the present invention and of the conventional LCD having no storage capacitor respectively, and the dotted curve (b) indicates the pixel voltage of the conventional separate-electrode-type LCD.

As shown in FIG. 10, the pixel voltages (a) and (c) of the present invention and the conventional LCD having no storage capacitor decrease rapidly compared with the pixel voltage (b) of the conventional separate-electrode-type LCD. The rapid decrease of the pixel voltage (a) in the line inversion may be attributed to the simultaneous pixel voltage decrease of the adjacent pixel voltages due to the same amount of the leakage current.

If the leakage current of a pixel is higher than those of the other pixels, the simulation gives a different result, which is shown in FIG. 11. The resistance of the liquid crystal layer is $5\times10^{10}\Omega$ in this case.

The pixel voltage (a) of the LCD according to the fourth embodiment of the present invention decreases more slowly than the pixel voltage (c) the LCD having no storage capacitor, while it decreases more rapidly than the pixel voltage (b) of the conventional separate-electrode-type LCD.

FIG. 12 shows the case of the dot inversion. In this simulation, the voltage applied to the odd data lines were 10V, the voltage applied to the even data lines were 1V, and the resistance of the liquid crystal layer is $1\times10^{11}\Omega$.

As shown in FIG. 12, the voltage holding capability in the embodiment of the present invention represented by (b) is very good compared with those of the conventional LCDs represented by (a) and (c) which are in cases of the conventional separate-electrode-type LCD and the conventional LCD having no storage capacitor.

Figure 13:
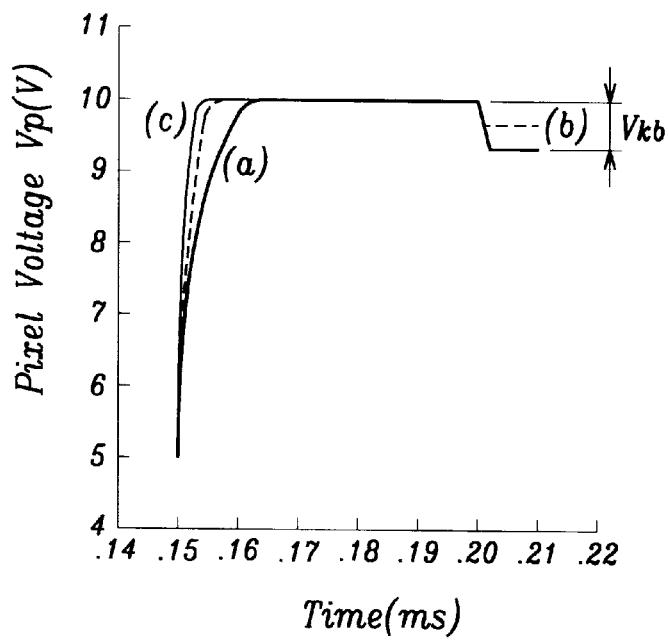
FIG. 13 is a graph showing the pixel voltage variation of the LCD of the fourth embodiment of the present invention.

FIG. 13 shows the variation of the pixel voltages during and immediately after charging of the pixels in case of the dot inversion. As shown in FIG. 13, the charging time of the present LCD represented by (a) is longer than those of the conventional separate-electrode type and no-storage capacitor type LCDs respectively represented by (b) and (c). The long charging time may be attributed to large voltage difference between the terminals of the storage capacitor.

In addition, the kickback voltage $V_{kb}$ of the present LCD is equal to that of the conventional LCD having no storage capacitor and larger than that of the conventional separate-electrode-type LCD. The large kickback voltage may be attributed to the simultaneous voltage drops of the adjacent pixels by the capacitive coupling with the gate voltage drop.

Figure 14:
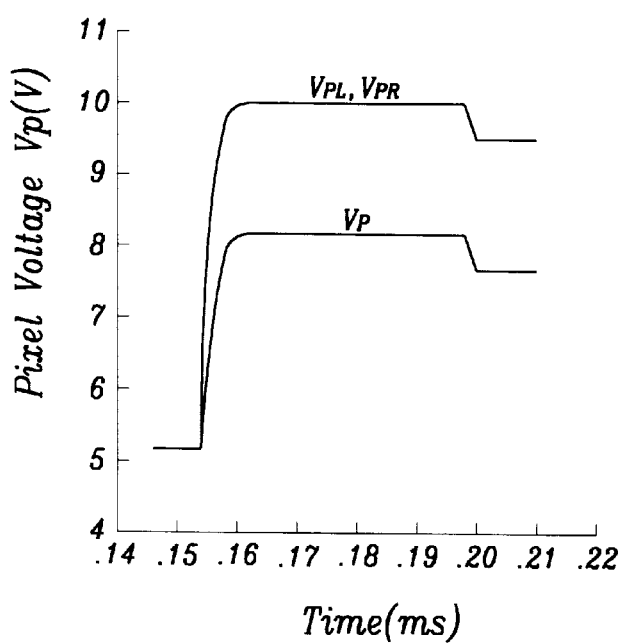
FIG. 14 is a graph showing the pixel voltage of the defective pixel of the LCD of the fourth embodiment of the present invention.

For the repaired pixel shown in FIG. 4, the pixel voltage of the repaired pixel is determined by the adjacent pixel voltages as shown in FIG. 14. The upper curve represents the left and right pixel voltage, and the lower curve is the pixel voltage of the repaired pixel.

A full color LCD according to the fourth embodiment of the present invention was made and tested. The LCD was 5.8" diagonal and has 234×400(×3 color) resolution. The image is as good as the conventional separate-electrode-type LCD, and the problems of crosstalk and flickering did not arise.

Now, other embodiments are described.

Figure 15:
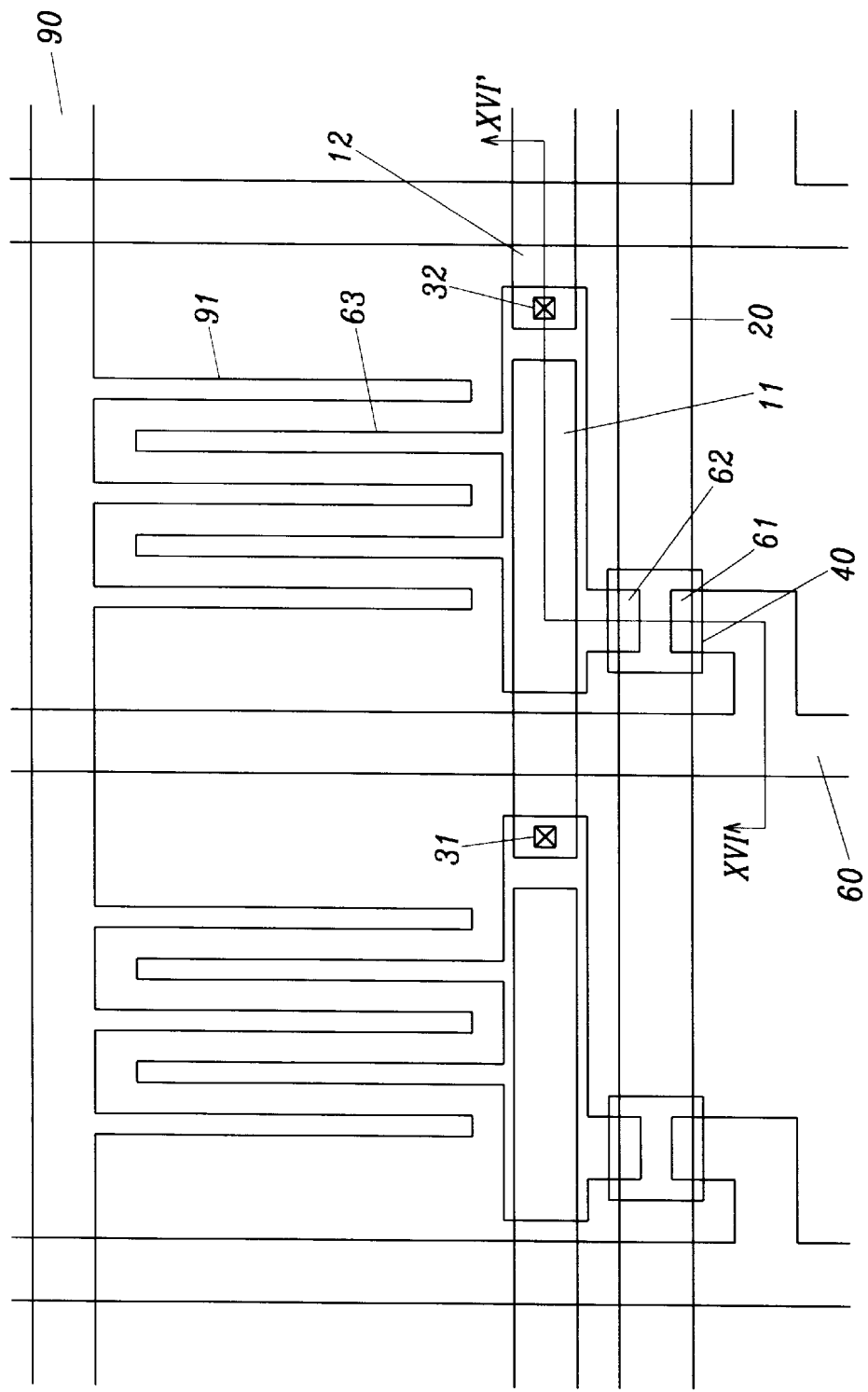
FIG. 15 illustrates a layout view of an LCD according to the fifth embodiment of the present invention.
Figure 16:
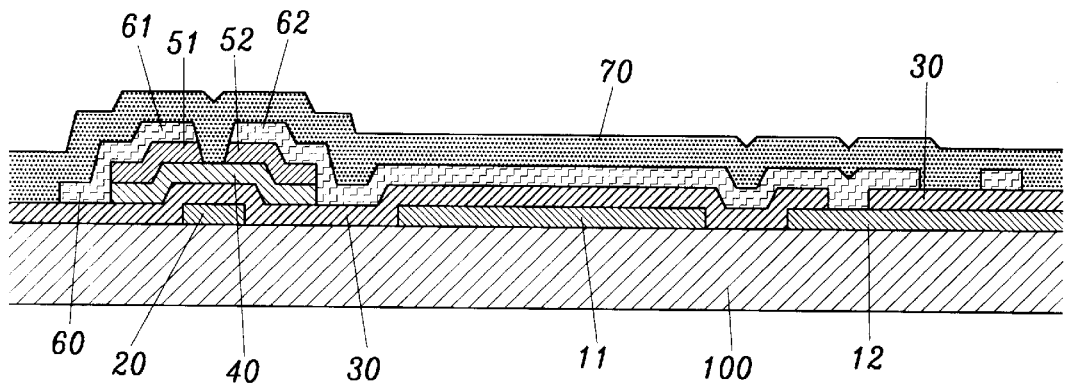
FIG. 16 is a cross-sectional view of the LCD shown in FIG. 15 taken along the line XVI–XVI'.

FIG. 15 is a layout view of an LCD according to the fifth embodiment of the present invention, and FIG. 16 is a cross-sectional view of the LCD shown in FIG. 15 taken along the line XVI–XVI'.

The LCD according to the fifth embodiment of the present invention has a linear pixel electrode and a linear common electrode which are formed on one of two substrates and parallel each other.

As shown in FIGS. 15 and 16, a gate line 20 transmitting a scanning signal from the outside is formed on a transparent insulating substrate 100. The gate line 20 extends in the transverse direction and a plurality of portions of the gate line 20 serve as gate electrodes. A common signal line 90 parallel to the gate line 20 is formed on the substrate 100, and the common signal line 90 is applied with a common signal from the outside. A plurality of spaced apart common electrodes 91, which are parallel to each other and connected to the common signal line 90, are formed on the substrate 100. A plurality of storage capacitor electrodes 11 and 12 are formed transversely on the substrate 100, and the storage capacitor electrodes 11 and 12 are separated from both a gate wire including the gate line 20 and a common signal wire including the common electrode line 90 and the common electrodes 91.

A gate insulating layer 30 made of insulator such as silicon nitride is formed over the gate wire 20, the common signal wire 90 and 91 and the storage capacitor electrodes 11 and 12. The gate insulating layer 30 has contact holes 31 and 32 exposing portions of the storage capacitor electrodes 11 and 12, respectively.

A plurality of channel layers 40 made of semiconductor such as amorphous silicon are formed on the portions of the gate insulating layer 30 over the gate electrodes. An ohmic contact layer 51 and 52 made of a material reducing the contact resistance between the channel layer 40 and wires thereon, in particular, made of heavily doped amorphous silicon is formed on each amorphous silicon layer 40, and the ohmic contact layer is divided into two portions 51 and 52 opposite each other with respect to the gate electrode.

A plurality of data lines 60 transmitting image signals are formed on the gate insulating layer 30, and extend in the longitudinal direction. The data lines 60 intersect the gate line 10 and the storage capacitor electrodes 11 and 12. Therefore, both ends of each storage capacitor electrode 11 are opposite each other with respect to the data line 60.

A source electrode 61 connected to one of the data line 60 and a drain electrode 62 are formed on the respective portions 51 and 52 of the ohmic contact layer.

The gate electrode, the gate insulating layer 30, the channel layer 40, the ohmic contact layer 51 and 52 and the source and the drain electrodes 61 and 62 form a TFT.

The drain electrode 62 is elongated in the transverse direction to overlap the storage capacitor electrode 11 and connected to the storage capacitor electrode 12 of an adjacent pixel through the contact hole 32 in the gate insulating layer 30. That is, the drain electrode 62 serves as the first electrode of a storage capacitor, and the storage capacitor electrode 11 overlapping the drain electrode 62 is the second electrode of the storage capacitor.

A plurality of pixel electrodes 63 are formed on the gate insulating layer 30, and connected to the drain electrode 62. Each pixel electrode 63 is placed between the common electrodes 91.

A passivation layer 70 made of an insulator such as silicon nitride or the like is formed over a channel layers 40 and a data wire including the data lines 60 and 65 and the source and the drain electrodes 61 and 62.

According to the fifth embodiment of the present invention, the passivation layer 70 formed all over the substrate, but, some portions of the passivation layer 70 may be removed when required, for example, in order to get a sufficiently large electric field.

A manufacturing method of an LCD according to the fifth embodiment of the present invention will now be described. FIGS. 17–20 are cross-sectional views showing the manufacturing process of the LCD shown in FIGS. 15 and 16. The manufacturing method according to the fifth embodiment uses 5 masks.

Figure 17:
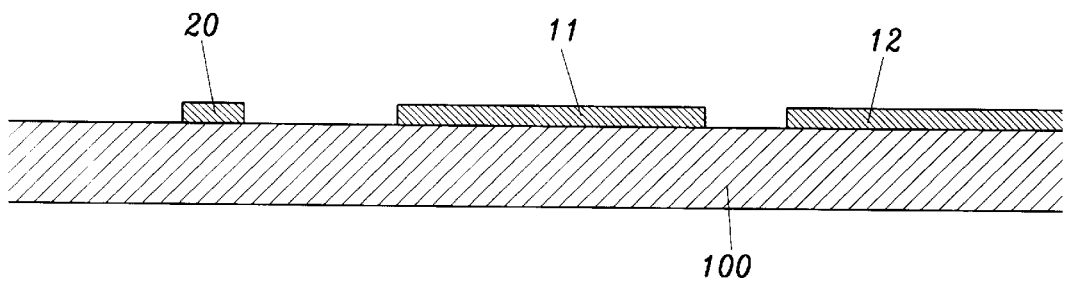
FIGS. 17–20 are cross-sectional views illustrating the manufacturing process of the LCD according to the fifth embodiment of the present invention.

First, as shown in FIG. 17, a metal layer made of aluminum or the like is deposited and patterned using a first mask to form a gate line 20, a common signal line 90, common electrodes 91 and storage capacitor electrodes 11 and 12.

Figure 18:
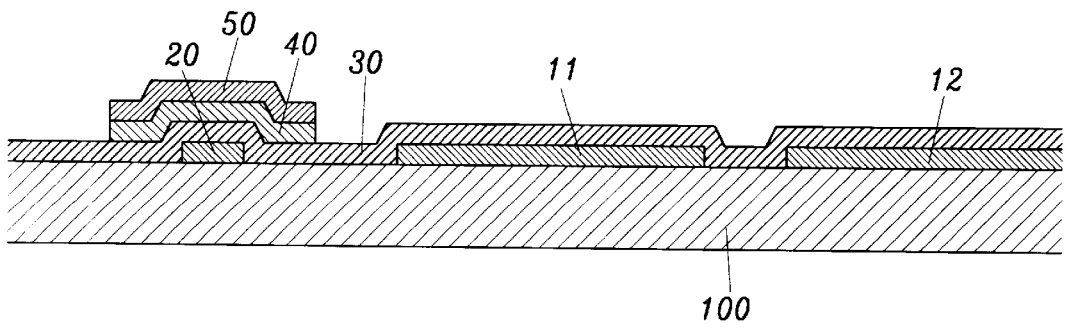

As shown in FIG. 18, a gate insulating layer 30 made of silicon nitride or organic insulating material, etc., a hydrogenated amorphous silicon layer 40 and an n+ hydrogenated amorphous silicon layer 50 heavily doped with n type impurities such as phosphorous are deposited in sequence. The doped amorphous silicon layer 50 and the intrinsic amorphous silicon layer 40 are photo etched to have island shapes on the gate electrode using a second mask.

Figure 19:
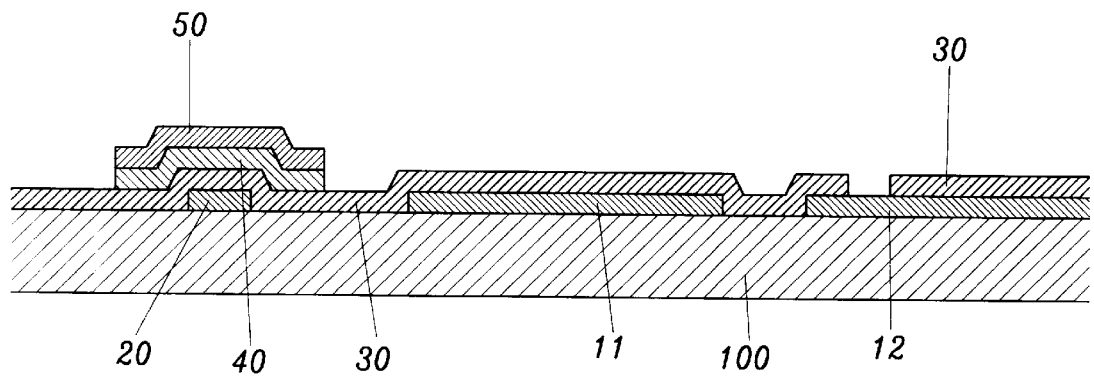

As shown in FIG. 19, the gate insulating layer 30 is patterned using a third mask to form contact holes 31 and 32 exposing the storage capacitor electrodes 11 and 12 respectively.

Figure 20:
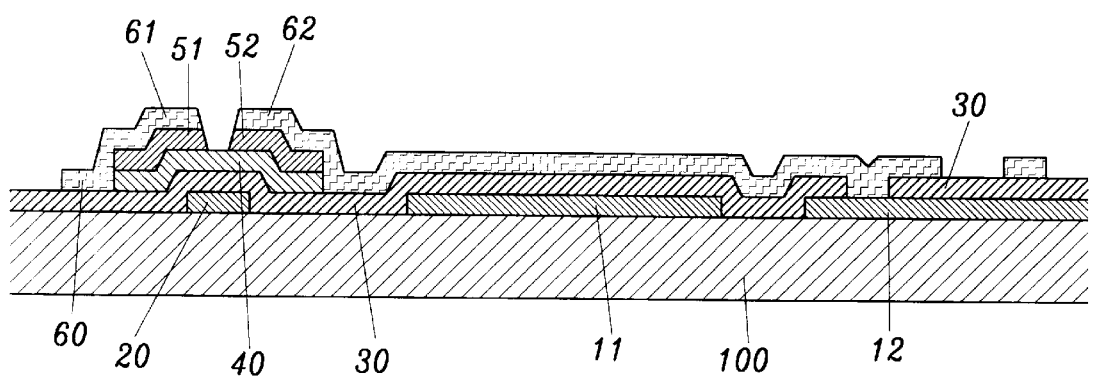

As shown in FIG. 20, a metal layer made of chromium or the like is deposited thereon, and etched using a fourth mask to form a data wire including a data line 60, a source and a drain electrodes 61 and 62 and pixel electrodes 63. Then, the exposed portions of the doped amorphous silicon layer 50 are etched using the data wire as an etch mask to divide the doped amorphous silicon layer into two portions and to expose the intrinsic amorphous silicon layer 40 between the two portions 51 and 52 of the doped amorphous silicon layer.

As shown in FIGS. 15 and 16, a silicon nitride or an organic insulating material layer is deposited to form a passivation layer 70.

In the sixth embodiment of the present invention, a pixel electrode line overlapping a common signal line is provided on the gate insulating layer to have a large storage capacitance.

Figure 21:
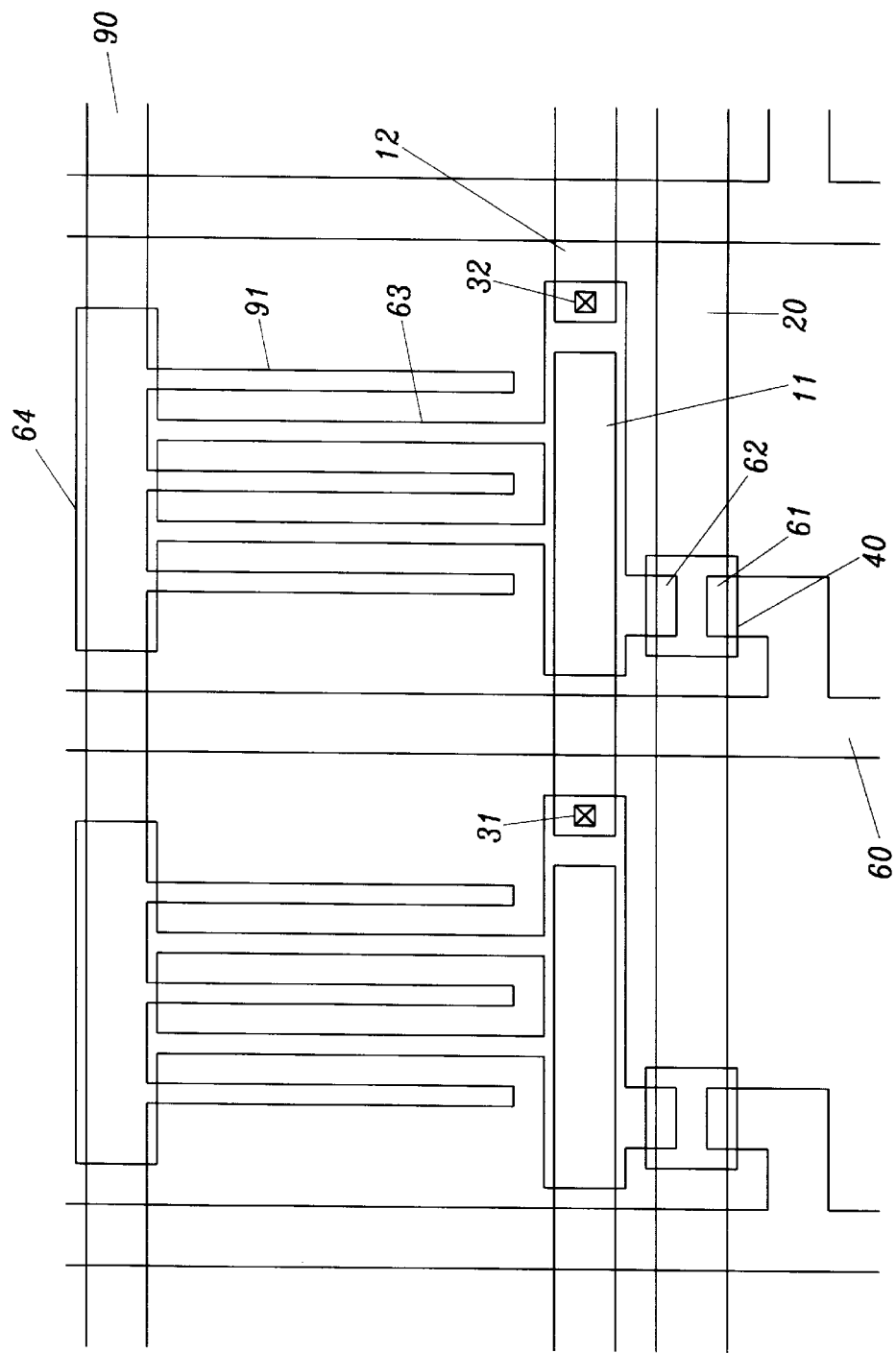
FIG. 21 is a layout view of an LCD according to the sixth embodiment of the present invention.

FIG. 21 illustrates a layout view of an LCD according to the sixth embodiment of the present invention.

As shown in FIG. 21, a pixel electrode line 64 connected to pixel electrodes 63 is formed on a gate insulating layer 30, and the pixel electrode line 64 overlaps a common signal line 90. Therefore, the storage capacitance is than that of the fifth embodiment because additional storage capacitance is generated between the pixel electrode line 64 and the common signal line 90. The remaining structure of the LCD is similar to the fifth embodiment.

As described above, the storage capacitor connected to the switching element of the leftmost pixel is floating, and the rightmost pixel has only one storage capacitor in the LCD illustrated in FIG. 3.

In order to solve these problem, the seventh to the ninth embodiments of the present invention are described with reference to FIGS. 22–24 which are equivalent circuit diagrams of TFT LCDs according to the seventh to the ninth embodiment of the present invention respectively.

Figure 22:
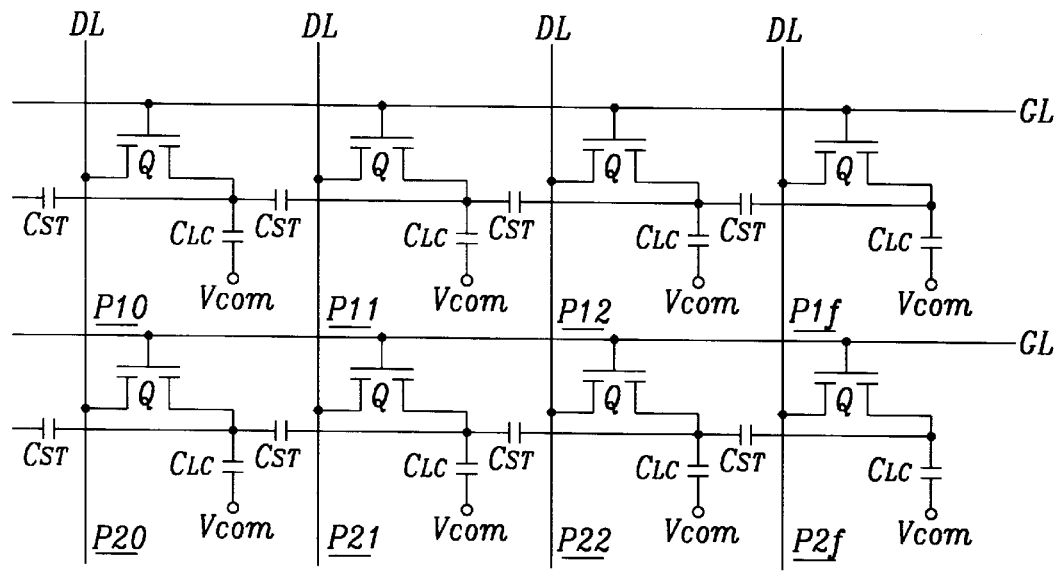
FIGS. 22–24 are equivalent circuit diagrams of TFT LCDs according to the seventh to the ninth embodiment of the present invention respectively.

As shown in FIG. 22, two columns of pixels P10, P20, P1$f$ and P2$f$ are added at both ends of the pixel array including the pixels P11, P12, P21 and P22 which are required for display. Therefore, each pixel P11, P12, P21 or P22 has two storage capacitors $C_{ST}$. The leftmost pixels P10 and P20 have two storage capacitors $C_{ST}$, one of which has a floating terminal, and the rightmost pixels P1$f$ and P2$f$ have only one storage capacitor $C_{ST}$. The leftmost and rightmost pixels P10, P20, P1$f$ and P2$f$ are dummy pixels which do not used for display.

Figure 23:
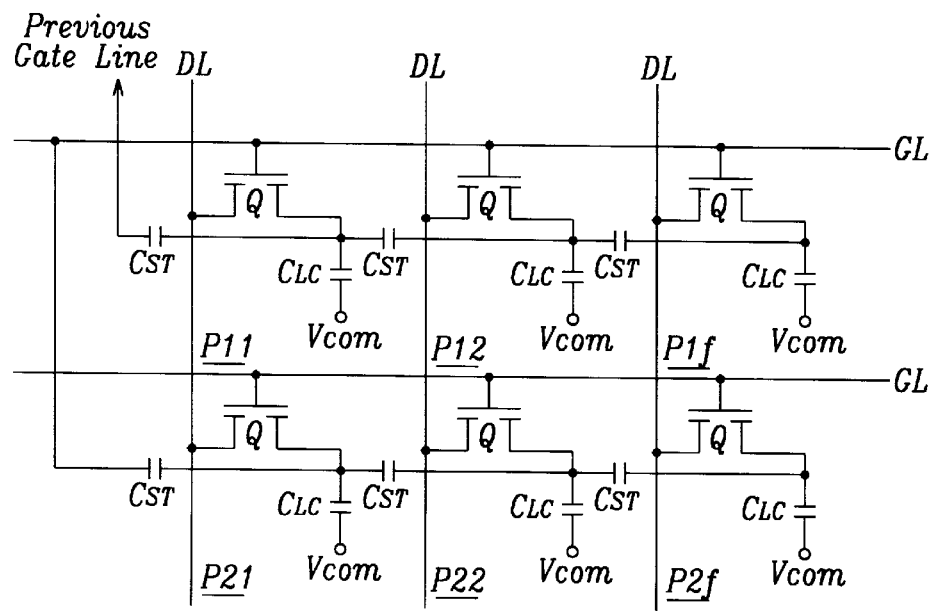
Figure 24:
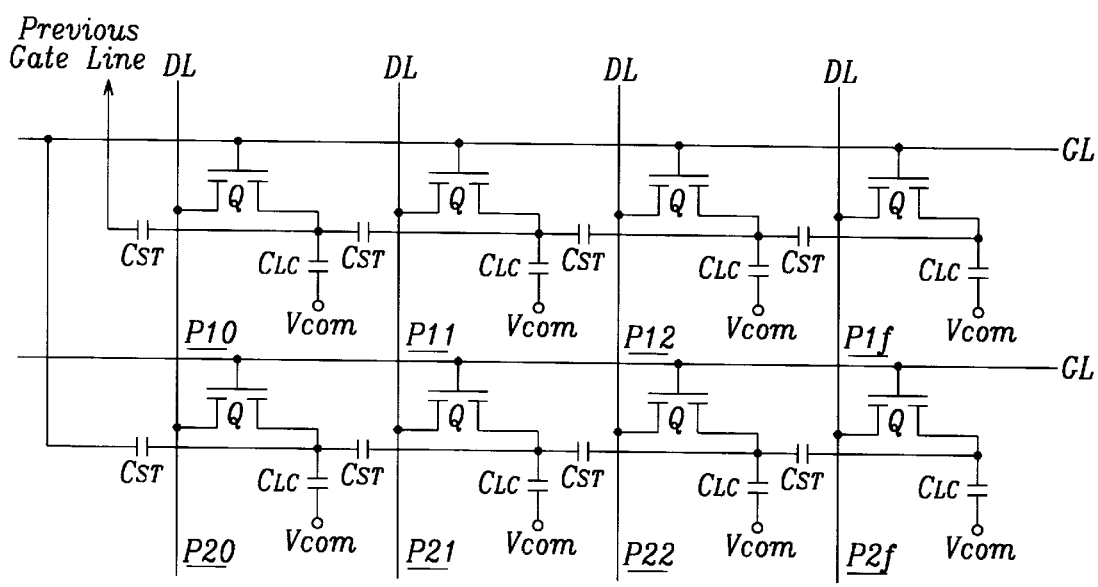

Another method is, as shown in FIG. 23, to make the floating reference terminal of the storage capacitor $C_{ST}$ of the leftmost pixel P11 and P21 to be connected to the previous gate line GL and to add a column of dummy pixels P1$f$ and P2$f$ at the right end of the pixel array.

Another method is to combine the above two methods. That is, two columns of dummy pixels P10, P20, P1$f$ and P2$f$ are added at the left and the right end of the pixel array and the floating terminals of the dummy pixels P10 and P20 are connected to the previous gate lines as shown in FIG. 24.

The same problems may occur, although not shown in the FIG. 5, in the second embodiment, and the problems may be solved using the similar method. That is, rows of dummy pixels having only one storage capacitor or a storage capacitor having a floating terminal may be added at the upper and the lower ends of the pixel array. The dummy pixels may not be used for display.

In the third embodiment, rows and columns of the dummy pixels are added at the left, the right, the upper and the lower ends of the pixel array.

As in the embodiments of the present invention, it is possible to reduce the parasitic capacitance and to repair the defective pixel easily by providing a storage capacitor having two terminals connected to the drain terminals of the adjacent pixels.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A liquid crystal display comprising:
   a plurality of gate lines which transmit scanning signals from outside;
   a plurality of data lines which transmit image signals from outside;
   a plurality of pixels arranged in a matrix shape, each pixel having a liquid crystal capacitor which has first and second terminals and a switching element which has a first terminal connected to the gate line, a second terminal connected to the data line and a third terminal connected to the first terminal of the liquid crystal capacitor; and
   a plurality of storage capacitors, each storage capacitor having a first terminal directly connected to a third terminal of a first pixel and a second terminal directly connected to a third terminal of a switching element of a different pixel.

2. The liquid crystal display of claim 1, wherein the first and the second terminals of the storage capacitors are connected to the third terminals of the switching elements of adjacent pixels.

3. A liquid crystal display comprising an array of pixels including first and second pixels located at opposite ends of the array of pixels, each pixel having a liquid crystal capacitor, a switching element and a storage capacitor having a first and a second terminals,
   wherein the first terminal of the storage capacitor of each pixel is directly connected to the switching element of the pixel, and the second terminal of the storage capacitor of each pixel, except the first pixel, is directly connected to the switching element of another pixel such that the switching element of each pixel, except the second pixel, is connected to at least two storage capacitors, and wherein at least one of the first and the second pixels is not used for display.

4. The liquid crystal display of claim 3, wherein the switching elements of adjacent pixels are connected to each other via one of the storage capacitors.

5. The liquid crystal display of claim 4, wherein the second terminal of the storage capacitor of the first pixel is floating.

6. A liquid crystal display comprising:
   an array of first pixels, each first pixel having a liquid crystal capacitor, a switching element and a first storage capacitor having a first terminal connected to the switching element and a second terminal;
   a second pixel which is located at an end of the array of the first pixels and has a liquid crystal capacitor, a switching element and a second storage capacitor having a first terminal connected to the switching element of the second pixel and a second terminal; and a third pixel which is located at an opposite end of the array of the first pixels and has a liquid crystal capacitor and a switching element, wherein the second terminal of the first storage capacitor of each first pixel is connected to the switching element of either another first pixel or the third pixel, and the second terminal of the second storage capacitor is connected to the switching element of at least one of the first pixels and the third pixel such that the switching element of each first pixel is directly connected to at least two of the first storage capacitors and the second storage capacitor, and the switching element of the third pixel is connected to only one of the first storage capacitors and the second storage capacitor, and wherein the third pixel is not used for display.

7. The liquid crystal display of claim 6, wherein the switching elements of adjacent two of the first, the second and the third pixels are connected to each other via one of the first and the second storage electrodes.

8. The liquid crystal display of claim 7, further comprising a third storage capacitor having a first terminal connected to the switching element of the second pixel and a second terminal which is floating.

9. A liquid crystal display comprising:

a plurality of pixels arranged in a matrix shape, each pixel including a liquid crystal capacitor having a first and a second terminals and a thin film transistor having a gate, a source and a drain connected to the first terminal of the liquid crystal capacitor;

a plurality of gate lines, each gate line connected to the gates of the pixels in a row;

a plurality of data lines, each data line connected to the sources of the pixels in a column;

a plurality of first storage capacitors, each first storage capacitor having a first and a second terminals directly connected to the drains of adjacent two of the pixels in a row; and a plurality of second storage capacitors, each second storage capacitor having a first terminal and a second terminal directly connected to the drain of one of the pixels in a first column located at a first end of the matrix, wherein the drain of each pixel in the first column is connected to one of the first and the second terminals of one of the first storage capacitors and to the second terminal of one of the second storage capacitors, the drain of each pixel in a second column located at a second end of the matrix opposite the first column is connected to only one of the first and the second terminals of one of the first storage capacitors, and the drain of each pixel in columns except for the first and the second columns is connected to two of the first storage capacitors, and wherein the pixels in one of the first and the second columns are not used for display.

10. The liquid crystal display of claim 9, wherein the first terminals of the second storage capacitors are floating.

11. The liquid crystal display of claim 9, wherein the first terminal of a second storage capacitor connected to the drain of a pixel in a first row is connected to one of the gate lines which is connected to the gates of the pixels in a row adjacent to the first row.

12. The liquid crystal display of claim 9, wherein the pixels of both the first and the second columns are not used for display.

13. The liquid crystal display of claim 12, wherein the first terminals of the second storage capacitors are floating.

14. The liquid crystal display of claim 12, wherein the first terminal of a second storage capacitor connected to the drain of a pixel in a first row is connected to one of the gate lines which is connected to the gates of the pixels in a row adjacent to the first row.

* * * * *